March 9, 1965 R. R. SCHNEIDER 3,172,300
JOY STICK CONTROL
Filed May 23, 1961

INVENTOR.
RALPH R. SCHNEIDER
BY
ATTORNEY

United States Patent Office 3,172,300
Patented Mar. 9, 1965

3,172,300
JOY STICK CONTROL
Ralph R. Schneider, Roanoke, Va., assignor to General Electric Company, a corporation of New York
Filed May 23, 1961, Ser. No. 111,985
5 Claims. (Cl. 74—471)

My invention relates to so-called "joy stick" controls for mechanical shafts. By the term "joy stick" I have reference to a single control member lever, or handle, which may be moved in any desired direction to effect corresponding rotation of a pair of control shafts.

An object of my invention is to provide a simple and economical joy stick control for a pair of control shafts, which may be utilized in hoist mechanism, for example, and which by manipulation of a single joy stick desired rotation of the two shafts in desired relationship and desired directions may be effected.

In accord with my invention the two shafts to be controlled are driven by respective drive shafts. These drive shafts are concentric, one being movable longitudinally of the other and provided with a cylindrical rack and a planar rack. The other drive shaft is arranged for rotation about the axis of the first and is provided with a spur gear which meshes with the cylindrical rack. This gear carries the joy stick by which it may be rotated about its own axis to vary the two drive shafts in their longitudinal relationship, without varying their angular relationship, and it may be bodily rotated about the cylindrical rack to vary the angular relationship of the two drive shafts, without varying their longitudinal relationship.

One of the control shafts is geared to the planar rack and the other geared by bevel gears to the other shaft.

Figure 1:
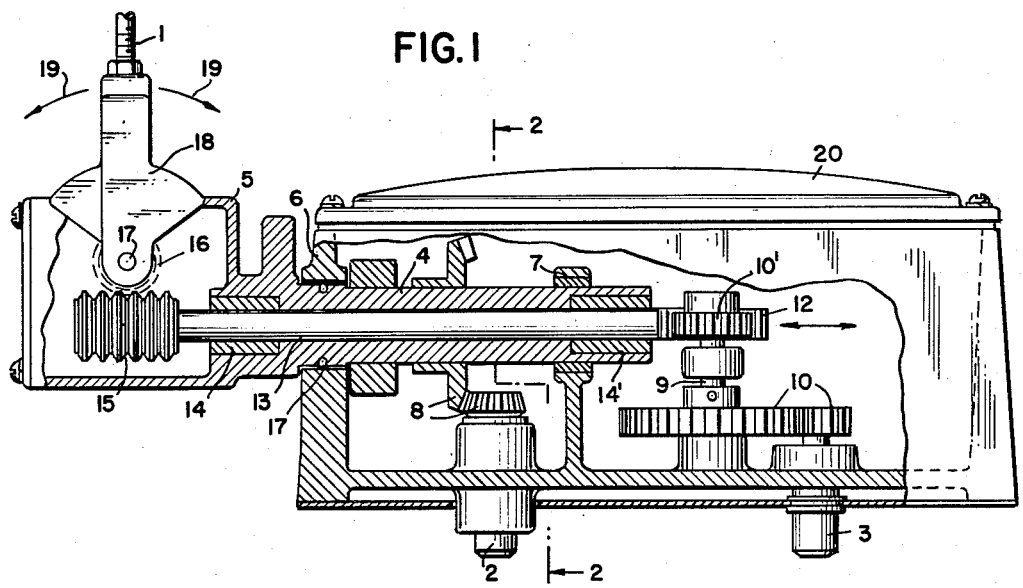
Figure 2:
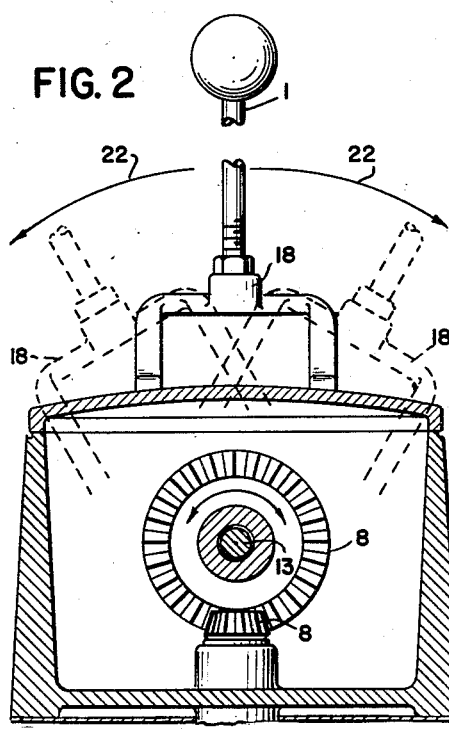
Figure 3:
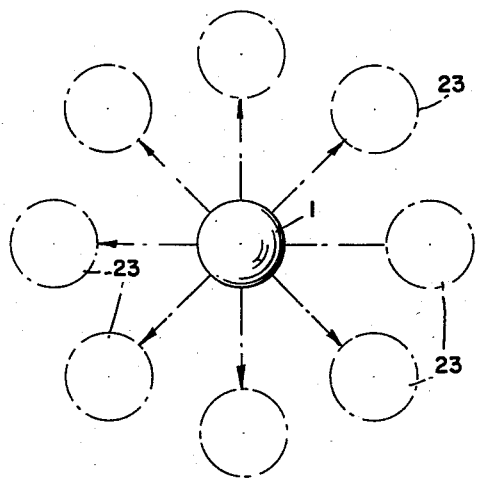

The novel features which I believe to be characteristic of my invention are set forth with particularity in the appended claims. My invention, itself, however, may best be understood by reference to the following description taken in connection with the accompanying drawing in which FIG. 1 represents an embodiment of my invention; FIG. 2 is a view partially in section on the line 2—2 of FIG. 1; and FIG. 3 shows various positions to which the joy stick of FIGS. 1 and 2 may be operated.

Referring to FIG. 1, I have shown therein a joy stick 1 arranged for movement in various directions to control the angular position, or rotation, of two control shafts 2 and 3. These shafts, for example, may be shafts employed to control a hoist such as one operating a clam shell bucket. One shaft may control movements of the bucket in azimuth and the other shaft may control its movements in elevation.

Shaft 2 is geared by means of gears 8 to a rotatable drive shaft 4, which carries a rotatable housing 5 at its left-hand end in which the joy stick is mounted, the shaft 4 being arranged for rotation within bearings 6 and 7.

Control shaft 3 is geared by means of spur gears 10 to a shaft 9 which carries a spur gear 10′ meshing with the planar rack 12 carried by a second drive shaft 13 which extends axially of and through the shaft 4, being mounted for longitudinal movements therein by bearings 14 and 14′.

In addition to the planar rack 12 carried by the shaft 13, this shaft also carries a cylindrical rack 15 at its left hand which has meshing with it a spur gear 16 which is rotated about a pivot 17 by the joy stick 1 which is attached thereto. Joy stick 1 is attached to a fork-shaped member 18 which rotates about pivot 17, the axis of which extends through the housing 5 parallel to an adjacent tangent to the cylindrical rack 15.

The joy stick may be rotated about the axis 17, as shown by the arrows 19 in FIG. 1, thereby, by reason of the engagement of spur gear 16 with the cylindrical rack 15, causing longitudinal movement of shaft 13 within shaft 4 and causing rotation of gears 10′ and 10, the first of which meshes with planar rack 12 and the latter of which produces rotation of control shaft 3.

Joy stick 1 may also be rotated in a plane at right angles to the plane of the paper, as shown in FIG. 2, where the yoke 18 is shown in full lines in its central position, and in dotted lines in positions to the left and right thereof. This rotation causes rotation of shaft 4 without rotation of shaft 13, the gear 16 moving bodily around the cylindrical rack 15 but without producing longitudinal movement thereof. This rotation drives the shaft 2 by reason of the pinions 8, one of which is mounted on the shaft 4 and the other of which is mounted on the control shaft 2.

Thus, movement of the joy stick 1 in the plane of the paper causes rotation of shaft 3 whereas movement at right angles to the plane of the paper causes rotation of shaft 2, each without rotating the other shaft.

On the other hand, however, joy stick 1 may be moved in any direction from the position shown in FIGS. 1 and 2, as shown by the various circles 23 in FIG. 3 which circles represent the knob on the end of the joy stick 1, thereby causing corresponding rotation of the two shafts by amounts corresponding to the instant position of the joy stick 1 as projected upon the plane of the paper, or a plane at right angles thereto.

Thus it will be seen that in a hoist application, the operator may grasp the handle of the joy stick and cause elevation of the hoist by movement of the joy stick in one plane, or the rotation in azimuth by rotation of the joy stick at right angles to the first movement and he may cause proportionate movement of the hoist by movement of the joy stick to intermediate positions.

If desired, the bearing 6 may comprise one wall of a housing 20 enclosing and, if desired, as in some maritime applications, water sealing all of that part of the equipment to the right of bearing 6, only the housing 5 (which is water sealed), and the joy stick being in the non-water protected area. Bearing 6 is shown as provided with a water tight ring, or packing 17, to prevent water from entering the housing 20 through the bearing.

While I have shown a single embodiment of my invention, it will, of course, be understood that modifications therein may be made and that I contemplate by the appended claims to cover any such modifications as fall within the true spirit and scope of my invention.

What I claim as new and desire to secure by Letters Patent of the United States is:

1. The combination, in a joy stick control for two control shafts, of two drive shafts, one being arranged for longitudinal movement longitudinally of the other, and the other being arranged for rotation with respect to said one, a spur gear and cylindrical rack connection between said drive shafts, and a joy stick to rotate said spur gear about its own axis to vary the longitudinal relationship of said drive shafts, and bodily about said cylindrical rack thereby to vary the angular relation of said shafts; and at any angle with respect to said spur gear axis and its bodily axis to simultaneously vary both the longitudinal and angular relationship of said shafts, and drive connections between each drive shaft and a respective one of said control shafts.

2. In combination, two coaxial shafts, one of said shafts being arranged for rotation about the axis of said shafts and carrying a gear, the other shaft being arranged for movement longitudinally of said one shaft and carrying a longitudinal rack meshed with said gear, and a joy stick to drive said gear and movable rotationally of said shafts, longitudinal of said shafts, or at any angle respective said rotational or longitudinal movement to produce relative movements of said shafts longitudinally and in rotation.

3. In combination, a pair of control shafts, means to rotate said shafts selectively and in unison in response to a movement of a single control member, said means comprising a pair of concentric drive shafts, one provided with a cylindrical rack and a planar rack, said planar rack being engaged by a spur gear driving one of said pair of control shafts in response to longitudinal movement of the respective drive shaft, and said cylindrical rack being engaged by a spur gear carried by the other of said drive shafts, said spur gear being arranged for rotation about an axis parallel to a tangent to said cylindrical rack at the point of contact therewith and for bodily rotation with said other drive shaft about said cylindrical rack whereby upon rotation of said spur gear about said spur gear axis said one drive shaft is moved longitudinally of itself driving said one control shaft and upon bodily rotation of said spur gear about said cylindrical rack said other drive shaft is rotated relative to said first drive shaft, and upon movement of said gear at any angle with respect to the spur gear axis and its bodily axis said one drive shaft is moved longitudinally and simultaneously therewith said other drive shaft is rotated with respect to said one drive shaft, and a gear drive between said other drive shaft and the other control shaft, said single control member comprising means to effect both types of rotation of said last mentioned spur gear.

4. In a joy stick control for a pair of control shafts, the combination of a pair of concentric drive shafts, the inner shaft having a cylindrical rack arranged for rotation about the axis of said shaft and engaged by a spur gear connected with the other drive shaft, said joy stick being connected to said spur gear whereby movement of the joy stick at right angles to the shafts rotates the outer shaft about the inner shaft and movement of the joy stick longitudinally of the shafts moves the inner shaft longitudinally of the outer shaft, said control shafts having gear connections with said drive shafts for movement in response to movement of said drive shafts in their respective directions whereby movement of said joy stick in either of said two directions and in directions at any angle thereto produces corresponding movement of said two control shafts.

5. In a joy stick control for a pair of control shafts, the combination of a joy stick, a spur gear responsive to said joy stick, a pair of coaxial drive shafts, said joy stick being secured to the outer drive shaft, the inner drive shaft having a cylindrical rack, said spur gear being in engagement with said cylindrical rack whereby movement of said joy stick longitudinally of the drive shafts moves the inner drive shaft longitudinally of the outer drive shaft and movement of said joy stick at right angles to the drive shafts rotates the outer shaft about the inner shaft, and movement of the joy stick in directions at an angle with respect to said longitudinal and right angle movement produces a corresponding movement of said inner and outer drive shafts, and means translating the longitudinal movement of said inner drive shaft to a first control shaft and further means translating the rotation of said outer drive shaft to a second control shaft.

References Cited by the Examiner

UNITED STATES PATENTS

| | | | |
|---|---|---|---|
| 671,947 | 4/01 | Arnold | 74—484 |
| 1,946,296 | 2/34 | Stephanson | 334—40 X |
| 2,499,152 | 2/50 | Morgan | 74—473 |
| 2,747,035 | 5/56 | Hansen et al. | 74—471 X |
| 2,861,465 | 11/58 | Winkle et al. | 74—484 X |
| 2,929,258 | 3/60 | Mackway. | |
| 2,948,163 | 8/60 | Stone | 74—472 |

FOREIGN PATENTS

| | | |
|---|---|---|
| 121,652 | 6/01 | Germany. |
| 664,594 | 1/52 | Great Britain. |

BROUGHTON G. DURHAM, *Primary Examiner.*